(No Model.)

J. B. HURD.
HAND CULTIVATOR.

No. 308,163. Patented Nov. 18, 1884.

WITNESSES:
Chas. Nida
C. Sedgwick

INVENTOR:
J. B. Hurd
BY Munn & Co
ATTORNEYS.

UNITED STATES PATENT OFFICE.

JUDSON B. HURD, OF HARDIN, TEXAS.

HAND-CULTIVATOR.

SPECIFICATION forming part of Letters Patent No. 308,163, dated November 18, 1884.

Application filed August 6, 1884. (No model.)

*To all whom it may concern:*

Be it known that I, JUDSON B. HURD, of Hardin, in the county of Hardin and State of Texas, have invented certain new and useful Improvements in Hand-Cultivators, of which the following is a full, clear, and exact description.

Reference is to be had to the accompanying drawings, forming part of this specification, in which similar letters of reference indicate corresponding parts in all the figures.

Figure 1:
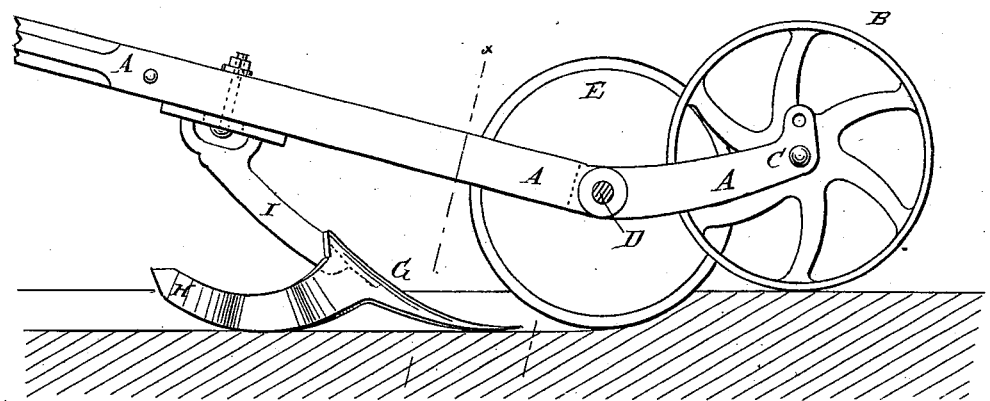
Figure 2:
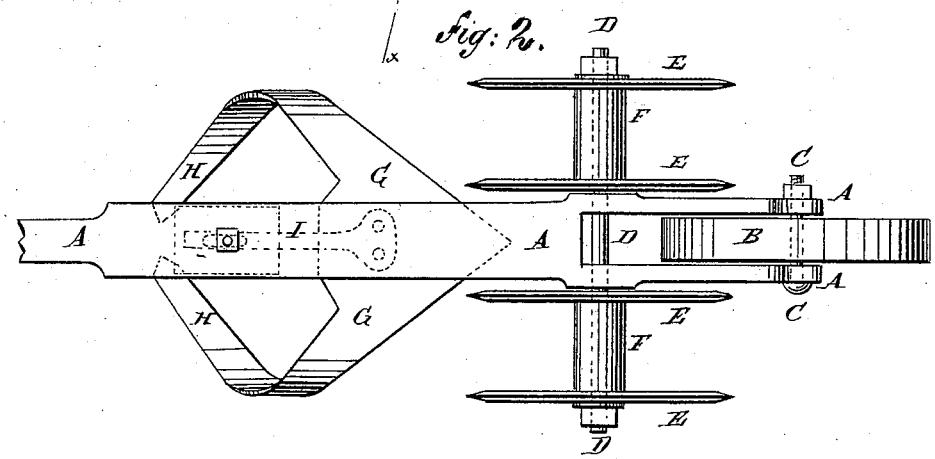
Figure 3:
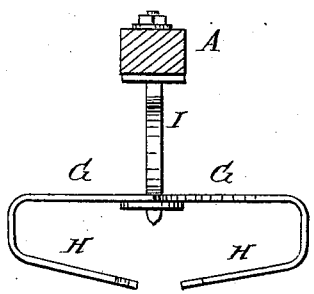

Figure 1 is a side elevation of my improvement. Fig. 2 is a plan view of the same. Fig. 3 is a sectional front elevation of the same, taken through the line $x\,x$, Fig. 1.

The object of this invention is to provide hand-cultivators constructed in such a manner as to cut up and destroy grass and weeds without throwing the soil around and covering small plants, and without breaking the soil away from around the plants.

The invention consists in a hand-cultivator constructed with a plow-plate having wings bent downward, rearward, and inward, to adapt it to destroy the grass and weeds and leave the soil level. With the plow-beam and winged plow are connected two or more rotary cutters, whereby the soil, roots, grass, and weeds will be cut in parallel lines in front of the plow-plate. With the plow-beam, in front of the rotary cutters, is connected a gage-wheel, whereby the depth to which the machine works in the ground can be readily regulated, as will be hereinafter fully described.

A represents the plow-beam, the forward end of which is slotted to receive the gage-wheel B. The forward ends of the branches of the beam A are made L or T shaped, and have two or more holes formed through them, to receive the pivoting-bolt C of the gage-wheel B, so that the said gage-wheel B can be readily adjusted to allow the cultivator to work deeper or shallower in the soil.

To the beam A, a little in the rear of the gage-wheel B, are attached, or in it are formed, bearings to receive the axle or rod D, upon which are placed four (more or less) thin rotary cutters, E, kept at the proper distance apart by tubular washers F, placed between them upon the said rod. The cutters E, or the outer cutters when more than two are used, are placed in line with or a little beyond the outer corners of the plow-plate G, so as to cut the soil, roots, grass, and weeds at the sides of the plants, and thus prevent the soil around the plants from being broken or torn away by the action of the said plow-plate. The plow-plate G, called by me a "shovel hoe-blade," is made with its middle part like an ordinary shovel-plow, but has wings H formed upon it, which are bent downward, rearward, and inward, as shown in Fig. 2.

I is the standard, the lower end of which is secured by rivets or other suitable means to the upper middle part of the plow-plate G. The upper end of the standard I is bolted or otherwise secured to the beam A. A single standard, I, can be used, as shown in the drawings, or two standards, or a forked standard attached to the upper side parts of the plow-plate G and to the beam A. The beam A is designed to have a cross-bar or other suitable handle attached to its rear end, for convenience in using the cultivator. The handle is not shown in the drawings, as there is nothing new in its construction. With this construction the soil that is raised and moved outward slightly by the passage beneath it of the plow will be moved back and leveled by the wings H, and the ground left level and smooth, any grass or weeds left by the body of the plow-plate being destroyed by the wings.

Having thus described my invention, I claim as new and desire to secure by Letters Patent—

1. In a hand-cultivator, the plow-plate made, substantially as herein shown and described, with a middle part, G, having wings H bent downward, inward, and rearward, to adapt it to destroy the grass and weeds and leave the soil level, as set forth.

2. In a hand-cultivator, the combination, with the plow-beam A and the winged plow-plate G H, of two or more rotary cutters, E, substantially as herein shown and described, whereby the soil, roots, grass, and weeds will be cut in parallel lines in front of the said plow-plate, as set forth.

3. In a hand-cultivator, the combination, with the plow-beam A, the rotary cutters E, and the winged plow-plate G H, of the gage-wheel B, substantially as herein shown and described, whereby the machine can be readily adjusted to work deeper or shallower in the ground, as set forth.

JUDSON B. HURD.

Witnesses:
E. H. COLLINS,
B. B. JONES.